(12) United States Patent
Toyserkani et al.

(10) Patent No.: US 11,271,912 B2
(45) Date of Patent: Mar. 8, 2022

(54) ANONYMOUS COMMUNICATION OVER VIRTUAL, MODULAR, AND DISTRIBUTED SATELLITE COMMUNICATIONS NETWORK

(71) Applicant: Envistacom, LLC, Atlanta, GA (US)

(72) Inventors: Kasra Toyserkani, Rockville, MD (US); Michael Beeler, Jefferson, MD (US); Cris Mamaril, Mesa, AZ (US); Michael Geist, Huntersville, NC (US)

(73) Assignee: ENVISTACOM, LLC, Atlanta, GA (US)

( * ) Notice: Subject to any disclaimer, the term of this patent is extended or adjusted under 35 U.S.C. 154(b) by 318 days.

(21) Appl. No.: 16/600,258

(22) Filed: Oct. 11, 2019

(65) Prior Publication Data

US 2021/0099434 A1 Apr. 1, 2021

Related U.S. Application Data

(60) Provisional application No. 62/907,320, filed on Sep. 27, 2019.

(51) Int. Cl.
| | | |
|---|---|---|
| *H04L 9/00* | (2006.01) | |
| *G06F 21/00* | (2013.01) | |
| *H04L 29/06* | (2006.01) | |
| *H04B 7/185* | (2006.01) | |
| *H04W 76/10* | (2018.01) | |
| *H04L 61/5007* | (2022.01) | |

(52) U.S. Cl.
CPC ..... *H04L 63/0478* (2013.01); *H04B 7/18523* (2013.01); *H04L 63/0414* (2013.01); *H04L 63/0485* (2013.01); *H04L 63/062* (2013.01); *H04L 63/1475* (2013.01); *H04W 76/10* (2018.02); *H04L 61/2007* (2013.01)

(58) Field of Classification Search
CPC ............ H04B 7/18523; H04L 63/0414; H04L 63/0478; H04L 63/0485; H04L 63/062; H04L 63/1475; H04W 76/10
USPC .......................................................... 713/151
See application file for complete search history.

(56) References Cited

U.S. PATENT DOCUMENTS

| | | | |
|---|---|---|---|
| 8,089,993 B2 | 1/2012 | Wei et al. | |
| 8,510,548 B1 * | 8/2013 | Markov | .................. H04L 69/22 |
| | | | 713/150 |
| 8,542,755 B2 | 9/2013 | Kopmeiners | |
| 9,065,699 B2 | 6/2015 | Stratigos, Jr. | |
| 9,112,758 B2 | 8/2015 | Niu et al. | |
| 9,264,125 B2 | 2/2016 | Moshfeghi | |
| 9,893,774 B2 | 2/2018 | Shattil | |
| 10,034,135 B1 * | 7/2018 | Provost | ................. H04W 4/025 |
| 10,064,149 B1 | 8/2018 | Anvari | |

(Continued)

FOREIGN PATENT DOCUMENTS

| | | |
|---|---|---|
| WO | 2017203534 A1 | 11/2017 |
| WO | 2018104929 A1 | 6/2018 |

OTHER PUBLICATIONS

International Search Report and Written Opinion of International Patent Application No. PCT/US18/38397 dated Jul. 27, 2018.

*Primary Examiner* — Haresh N Patel
(74) *Attorney, Agent, or Firm* — McBee Moore & Vanik IP, LLC

(57) ABSTRACT

The present disclosure relates to a system for providing an anonymous and obfuscated communication over a virtual, modular and distributed satellite communication network.

39 Claims, 6 Drawing Sheets

MULTI-LAYER ENCRYPTION PROVIDING NETWORK SECURITY AND OBFUSCATION

(56) References Cited

U.S. PATENT DOCUMENTS

| | | | |
|---|---|---|---|
| 10,311,002 B2 | 6/2019 | Kawai et al. | |
| 10,621,365 B1* | 4/2020 | Powers | H04L 9/0894 |
| 10,735,324 B2* | 8/2020 | Torres | H04L 47/24 |
| 11,122,079 B1* | 9/2021 | Aloisio | G06F 21/14 |
| 2008/0112361 A1 | 5/2008 | Wu | |
| 2010/0064369 A1* | 3/2010 | Stolfo | G06F 21/566 |
| | | | 726/24 |
| 2011/0173251 A1* | 7/2011 | Sandhu | G06F 21/53 |
| | | | 709/203 |
| 2012/0117376 A1* | 5/2012 | Fink | H04L 29/12433 |
| | | | 713/153 |
| 2014/0123101 A1 | 5/2014 | Kim | |
| 2014/0376418 A1 | 12/2014 | Banerjea | |
| 2015/0036664 A1 | 2/2015 | Yuk et al. | |
| 2016/0036816 A1* | 2/2016 | Srinivasan | H04L 61/1511 |
| | | | 726/1 |
| 2016/0134376 A1 | 5/2016 | Mateosky et al. | |
| 2016/0227396 A1 | 8/2016 | Lee et al. | |
| 2016/0261404 A1* | 9/2016 | Ford | H04L 67/104 |
| 2017/0041296 A1* | 2/2017 | Ford | G06F 16/951 |
| 2017/0126260 A1 | 5/2017 | Torbatian et al. | |
| 2017/0367277 A1 | 12/2017 | Mohindra | |
| 2018/0167365 A1* | 6/2018 | Zarcone | H04L 63/14 |
| 2018/0241760 A1* | 8/2018 | Stephens | H04L 63/0281 |
| 2019/0007756 A1* | 1/2019 | Navali | H04L 65/608 |
| 2020/0320406 A1* | 10/2020 | Antonatos | G06F 21/6254 |

* cited by examiner

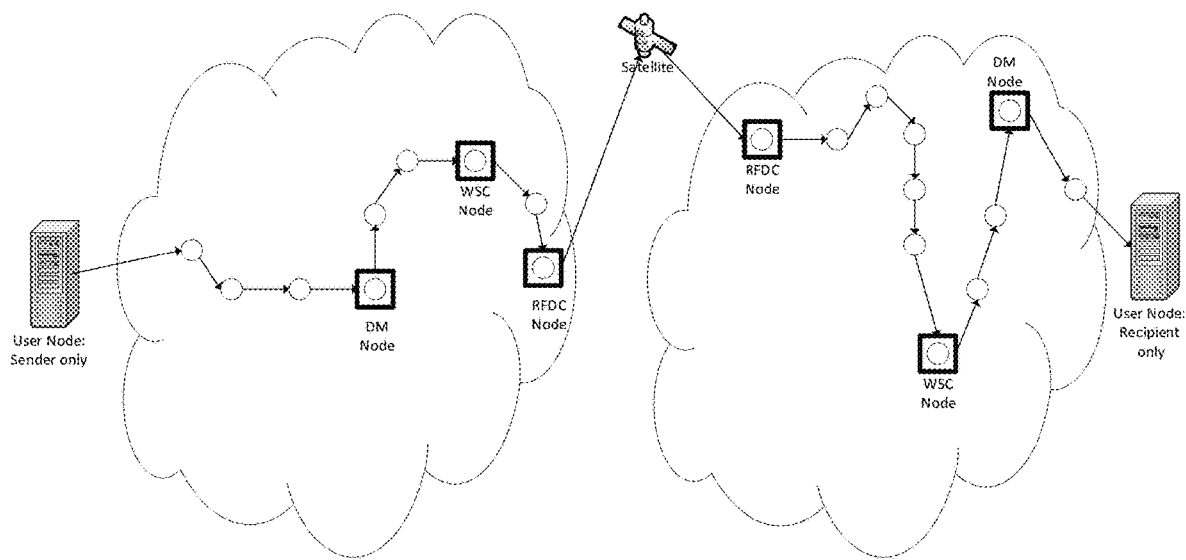
FIG 1 – (PRIOR ART) MODULAR COMMUNICATION INFRASTRUCTURE
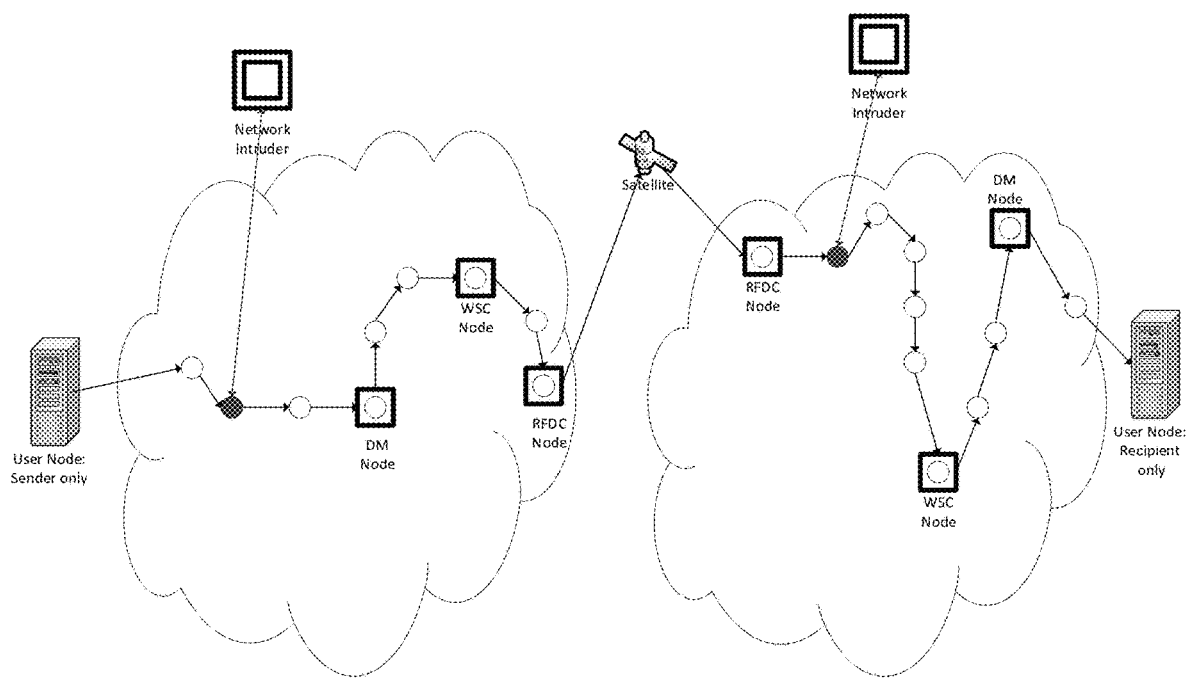
FIG 2 – (PRIOR ART) EAVESDOPPING BY NETWORK INTRUDERS

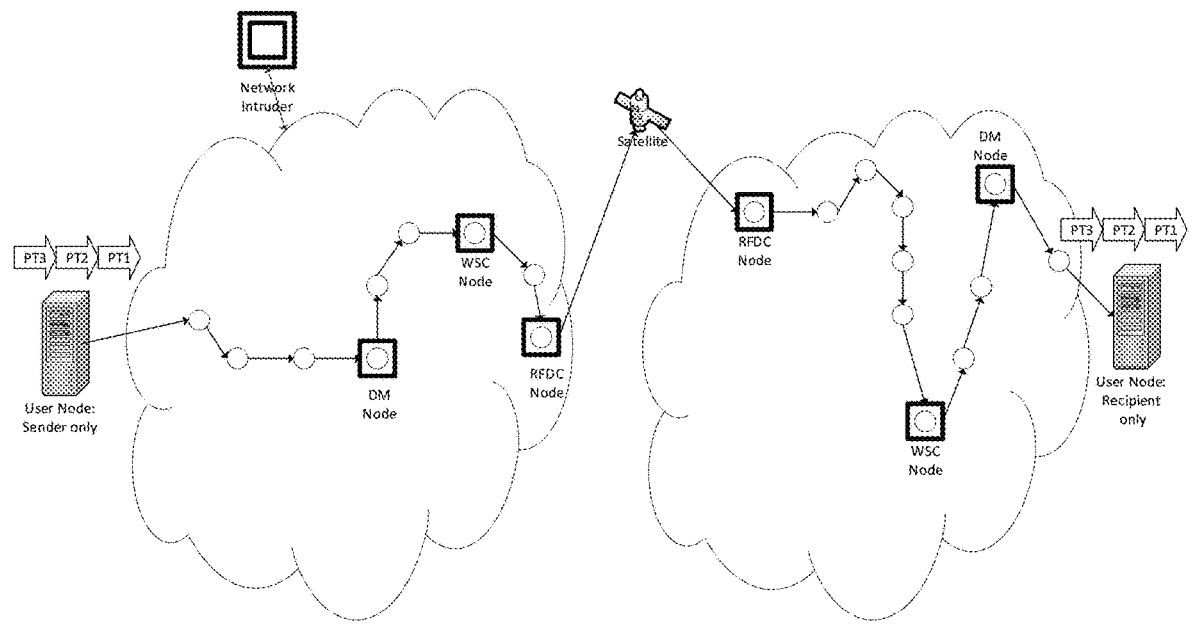
FIG 3 – (PRIOR ART) TRAFFIC ANALYSIS BY NETWROK INTRUDER
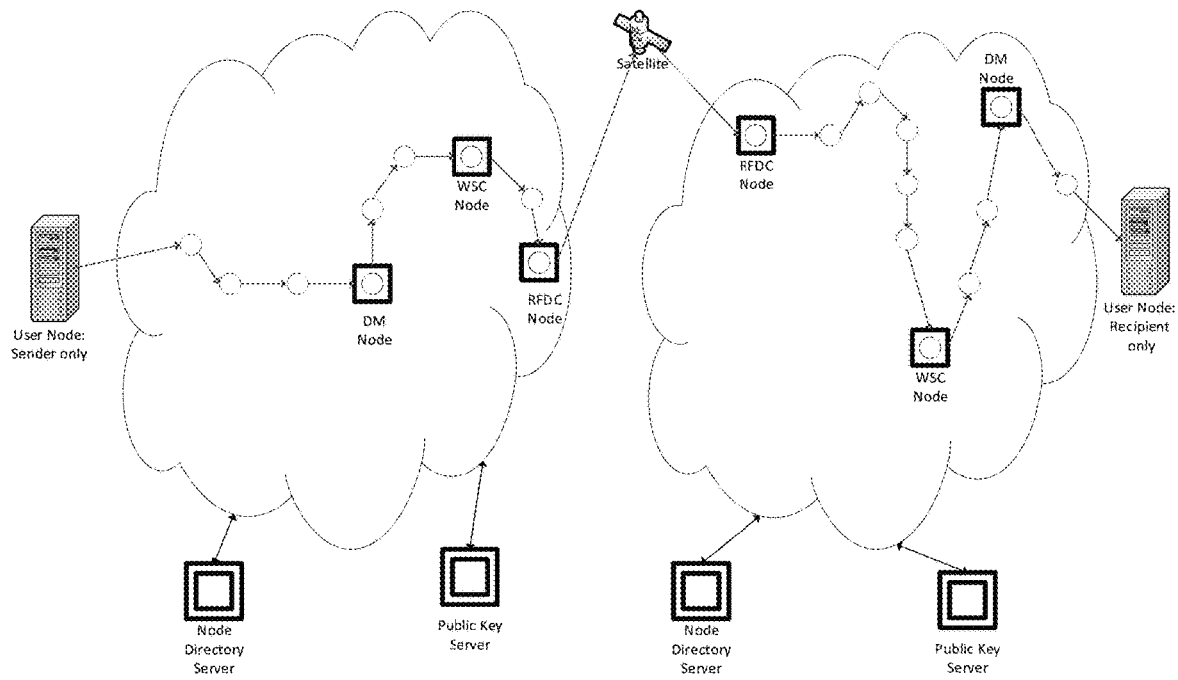
FIG 4 – OBFUSCTAED AND VIRTUALIZED COMMUNICATION INFRASTRUCTURE

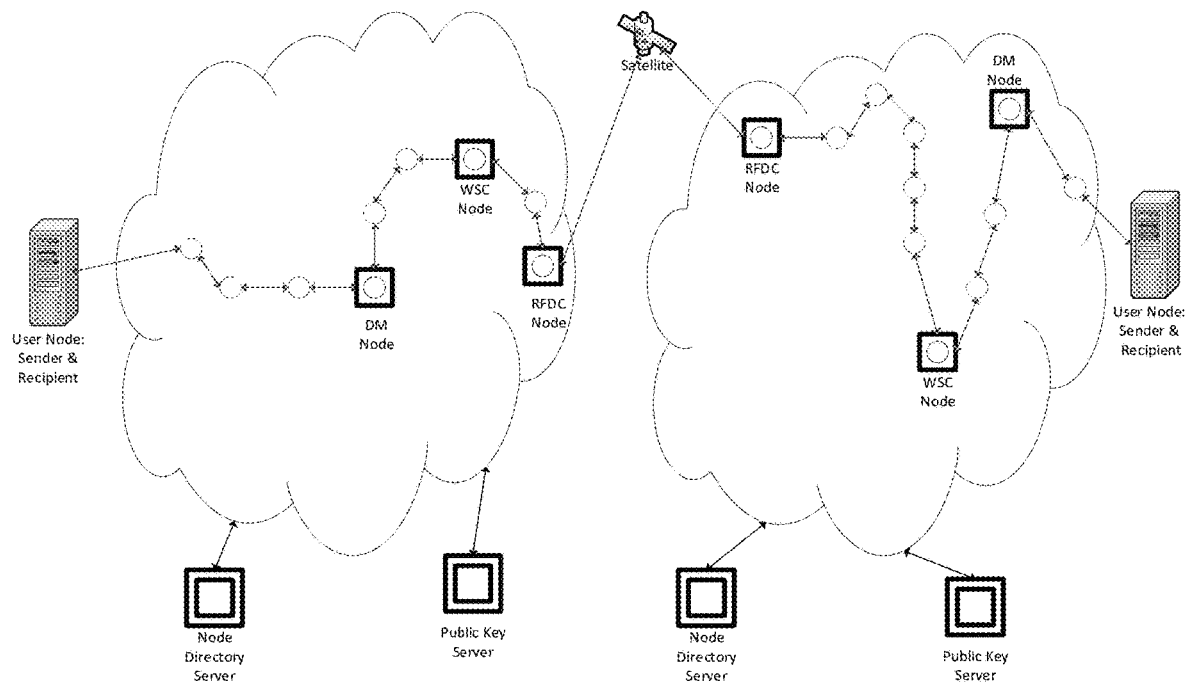
FIG 5 – OBFUSCTAED AND VIRTUALIZED COMMUNICATION INFRASTRUCTURE
FOR BIDRECTIONAL COMMUNICATION
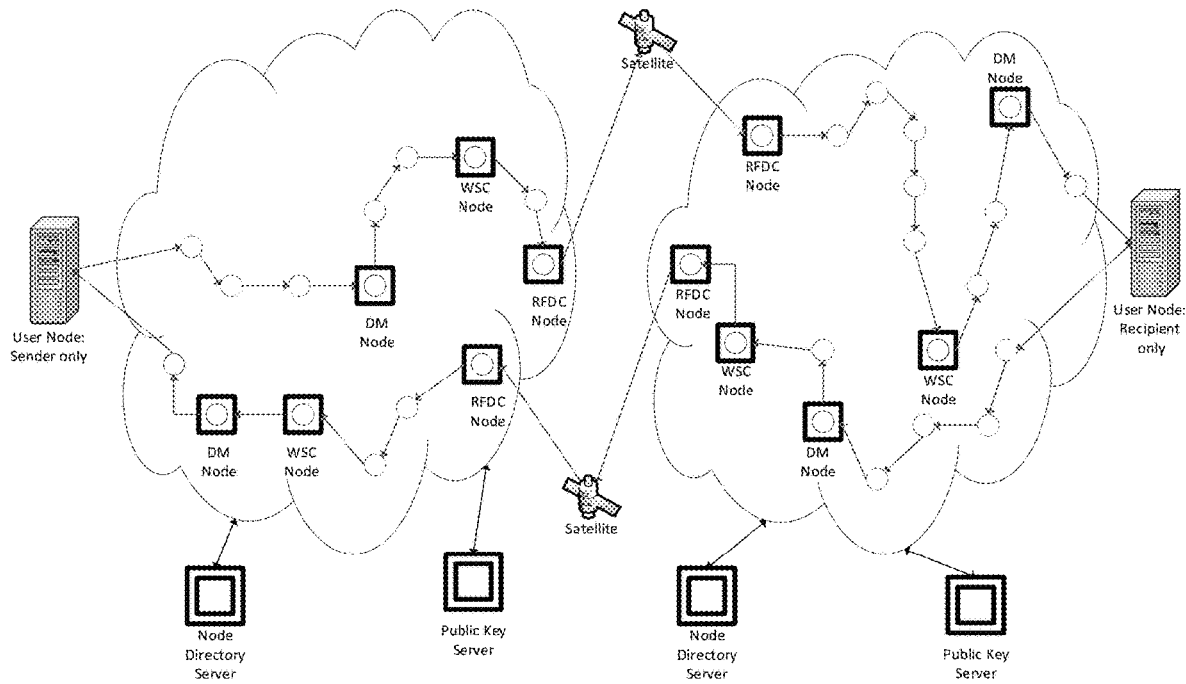
FIG 6 – BIDRECTIONAL COMMUNICATION USING TWO INDEPENDENT CIRCUITS

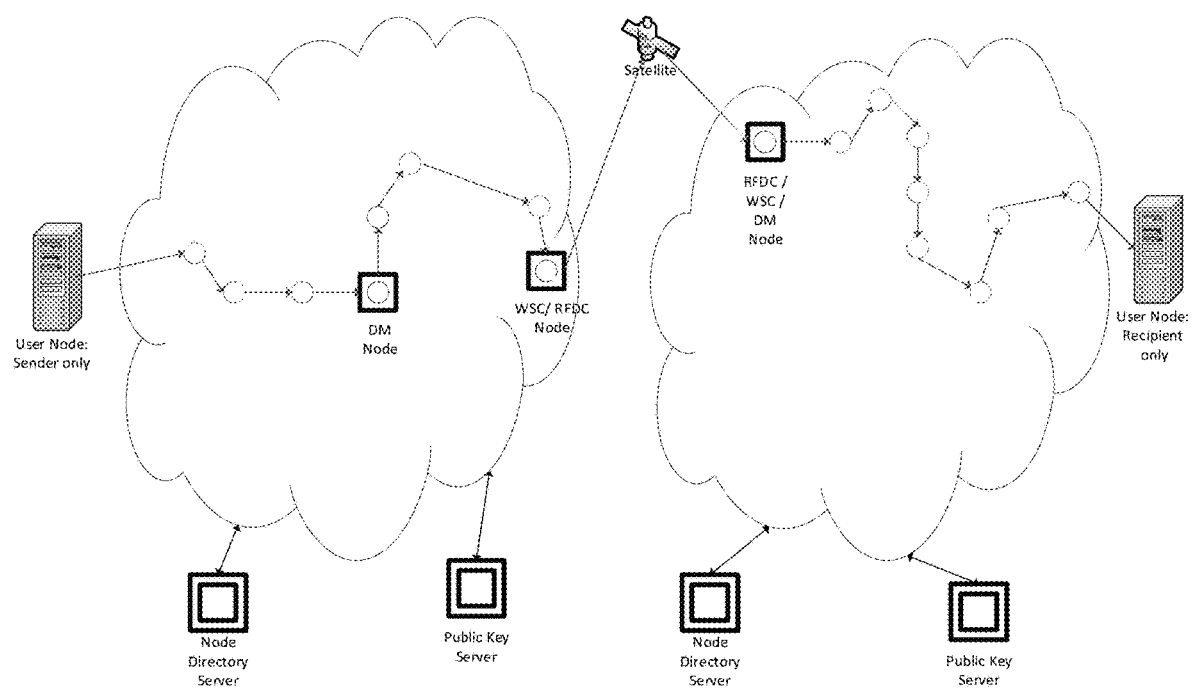
FIG 7 – SPECIALIZED NODES COMBINED

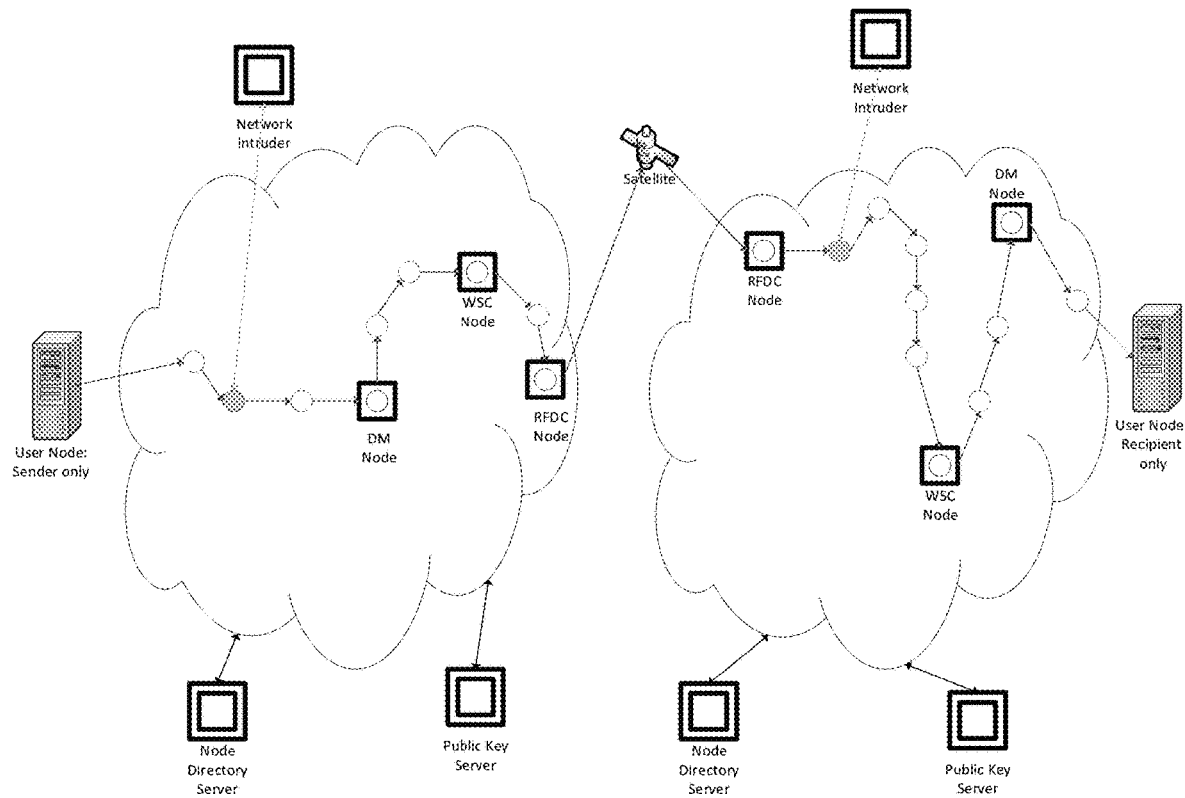
FIG 8 – MULTI-LAYER ENCRYPTION PROVIDING NETWORK SECURITY AND OBFUSCATION
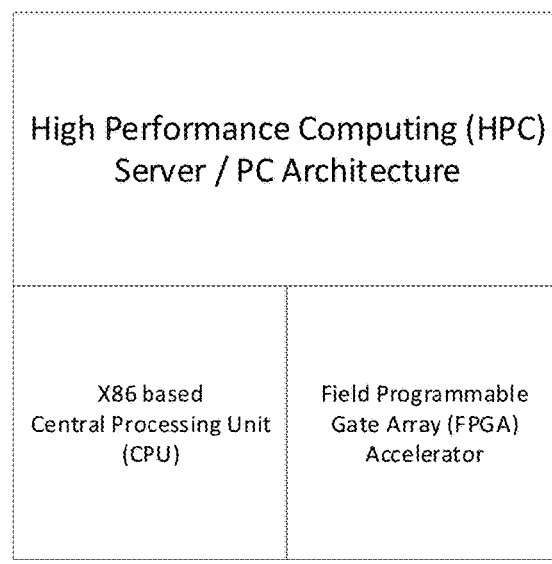
FIG 9 – HPC ARCHITECTURE FOR HOSTING VIRTUALIZED APPLICATION

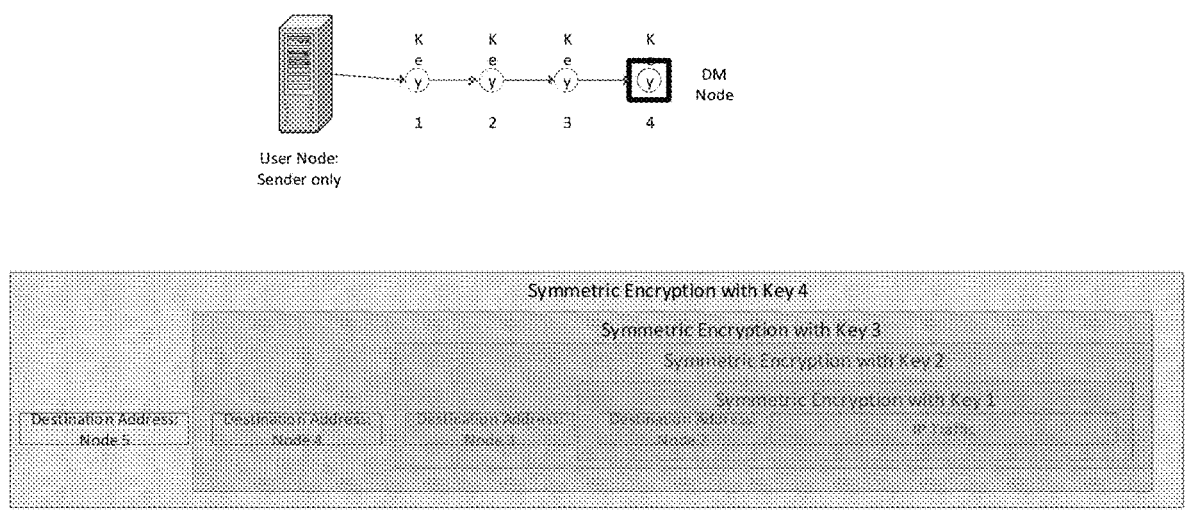
FIG 10 – MULTI-LAYER ENCRYPTION AND ROUTING

ANONYMOUS COMMUNICATION OVER VIRTUAL, MODULAR, AND DISTRIBUTED SATELLITE COMMUNICATIONS NETWORK

CROSS-REFERENCE TO RELATED APPLICATIONS

This patent application claims the benefit of U.S. Provisional Patent Application No. 62/907,320, filed on 27 Sep. 2019. The disclosure of the priority application is incorporated in its entirety herein by reference.

BACKGROUND

The objective of this method is to provide anonymous and obfuscated communication over a virtual, modular and distributed satellite-based communications network. A modular and distributed satellite communications network is one where the Users, the Digital Modem (DM), the Wideband Signal Channelizer (WSC), and the Radio Frequency Digital Converter (RFDC) are not collocated and interconnected over a network. The User transmits and receives user data over the network. The DM, which performs the baseband signal processing to modulate and demodulate the satellite waveforms, is a virtualized software application running on a High Performance Computing (HPC) PC or server, which consists of one or more Central Processing Unit (CPU) cores and minimally a hardware acceleration component that may be a Field-Programmable Gate Array (FPGA), a Graphic Processing Unit (GPU), or a Digital Signal Processor (DSP). From here on, the HPC PC or server will simply be referred to as HPC. The WSC functions as a channelizer and converts the signal to base band for one or more DMs. The WSC is also a virtualized application targeting a HPC. The RFDC converts between Radio Frequency (RF) signal and digitized samples for transport to and from a WSC. The RFDC implements the high-speed Digital to Analog Converter (DAC) and Analog to Digital Converter (ADC) for this conversion. The RFDC is waveform agnostic and may support multiple frequency bands. Quite often the WSC and the RFDC may be combined into a single device, called an Edge Device. The RFDC is also a virtualized application targeting an HPC. However, the RFDC must also have the ADC and DAC components integrated within the HPC as for example a PCIe plug-in card.

The User would send user data over the network as ethernet packets to a DM. The DM would be configured to utilize a specific waveform to modulate the user data into a modulated signal, and to encapsulate and transport the digital I/Q samples of this modulated signal over the network as ethernet packets to a WSC. The WSC would group one or more carriers into sub-channels and transports the digitized samples as encapsulated data over the network as ethernet packets to a RFDC. In turn, the RFDC converts the digitized I/Q sub-channels from one or more WSC into RF signal for transmission over a satellite. There are various encapsulation methods of transport of data between these sub components in a distributed and modular satellite communications network, which is outside of the scope here. In some cases, proprietary encapsulation may be used. And in some cases, it may be based on standard, such as ANSI TIA 5041, which is based on VITA-49 protocol.

For reception of a satellite signal, the same path is traversed in reverse order and the inverse functionality is applied to recover the user data that is then received by another user.

The virtualized, modular, and distributed communications network topology serves many advantages, use cases, and benefits over a fully integrated and co-located communication systems. Some benefits include scalability, flexibility, and resiliency of the network. It is scalable because the communication network can be appropriately sized by simply instantiating more DMs and WSCs as instances of virtualized applications executed on HPCs in private data centers or in public data centers as cloud-based applications. It is flexible because the virtualized functionalities can easily be updated as software applications without the need to modify and change hardware components. It is resilient because various waveforms and communication paths can be selected in real-time to circumvent network congestion or communication path interruption. And, in some use cases, the communication terminals and the hub may simply be too far apart from each other. On the other hand, the modular and distributed communications network also creates a challenge where there is more opportunity for eavesdropping as user data and digitized modulated signals are now routed across a network. If any node in the network has been compromised, information pertaining to the sender and receiver, such as the source and destination IP addresses, location, amount and time of traffic, and the traffic content itself, can all be accessed by a network intruder.

SUMMARY

The novelty describes a method and system to obfuscate communications between sub-components in the virtual, modular and distributed satellite communications network and provides anonymous end-to-end communication between users. The method is based on multi-layer encryption routing to obfuscate user identity, source/destination IP addresses, location and to provide multi-layer encryption to provide anonymity and protect the network from traffic analysis and eavesdropping.

The method, from here on referred to as Obfuscated Virtual Communication (OVC) protocol, allows for the secure and anonymous routes to be created between the user and the DM, as well as, between the DM and the WSC, and between the WSC and the RFDC. Each secure and anonymous route between any two subcomponents in the communications path is called a chain. The OVC protocol also implements the cryptographic functionality for the chain. OVC protocol in combination with a satellite waveform that implements Transmission Security (TRANSEC) to obfuscate the communication path over the satellite between two users is also fully protected for a complete anonymous and end-to-end communication solution.

A user that needs to communicate can utilize the OVC protocol to define the chain of nodes to close a circuit with another user, where the circuit includes a satellite or wireless connection. The first node in every chain is called the source node, and is the user's HPC. The last node in a chain is called the destination node. Nodes that are capable to host and execute virtualized waveforms and have the required trust level are designated as DM nodes. Nodes that are capable of hosting and executing WSC and have the required trust level as a virtualized function are designated as WSC nodes. Nodes with capability to function as a RFDC and have the required trust level are designated as RFDC nodes. There are nodes that may have the resource capacity and trust level to function as more than one single device and may have multiple functional roles designated. The resource capacity of each node is determined based on the compute power of the node. The trust level of node depends on various factors, including where it is located. For example, a node that resides in a private data center and in a controlled environment would be much more trusted than a node that is part of a public data center in a cloud.

The connection between the User node and the DM node, between the DM node and the WSC node, and between the WSC node and the RFDC node are each referred to as a chain. Each chain may consist of multiple intermediary nodes. And, each chain is a separate multi-layer encrypted route, where the source node encrypts the traffic multiple times with the encryption key for every node in the chain. This creates a multi-layer encryption of both user data and the digitized modulated I/Q that is highly secure. As the data traverses the nodes along the chain, each intermediary node in a chain decrypts one of the layers to expose the next hop. Thus, each node in the link can only determine that the data is being sent from the prior node, and only knows the next node to send the data to. Thereby, the communication chain is held anonymous between the source node all the way through the destination node, and the traffic remains obfuscated and protected from any intermediary node in a network that may have been compromised.

The OVC protocol relies on the Node Directory Server (NDS) to obtain the list of nodes, their availability, and designated functionality or functionalities based on compute capacity and trust level. The NDS collects information from every node in the network to maintain and update the directory list. When a user requires communication circuit, the OVC protocol uses the directory list provided by the NDS to select the best path to close the circuit. The OVC designates which node in the path will function as the DM, WSC, and RFDC to convert between the modulated I/Q data and RF signal. It also determines the intermediary nodes along each chain.

The described method is supported by an HPC as the source node for every chain. Source nodes consist of the Users, the DM nodes, WSC nodes, and RFDC nodes. These nodes have specialized functionality, as well as, the burden of generating the multi-layer encrypted traffic at line rate. The intermediary nodes in every chain are simply performing a single decryption to remove one of the multi-layer encryption layers until the traffic is received by the destination node where the final layer of encryption is removed. Furthermore, the intermediary nodes are not performing specialized functions either. The intermediary nodes are simply forwarding the traffic from a prior node to the next. Utilizing the HPC server, which consists of one or more CPUs and consists of one or more integrated hardware acceleration device based on Graphic Processing Unit (GPU) or Field Programmable Gate Array (FPGA) provides a novel approach to performing the multi-layer encryption at extremely high-data rate resulting in nearly "line rate" operation required for the virtual, modular and distributed satellite communication infrastructure. The HPC heterogenous architecture provides the hardware capabilities needed for both hosting virtualized applications for the DM, the WSC, the RFDC, as well as, the OVC protocol. The OVC protocol, which includes the multi-layer encryption, will be implemented in a high-level programming language that supports heterogenous compute environments and parallel processing, such as the Open Computing Language (OpenCL) to generate, for example, a x86 compliant executable code. When a source node performs the multi-layer encryption aspects of the algorithm that are CPU intensive the algorithm (or method) can be implemented as optimized kernel code targeting the hardware acceleration device, such as the FPGA on an OpenCL compliant PCIe card. This method of implementation allows for much higher performance for the multilayer encryption functionality. The higher performance provided by the HPC supports the high throughput required to support a virtualized, modular, communications infrastructure. This is because after user data has been modulated, the throughput needed to transport the digitized I/Q signals can be significantly more than the actual user data. The throughput between the DM and the WSC, and the WSC and RFDC is all a function of the digitized bandwidth being transported, and this can be hundreds of Giga-bits-per-second (Gbps) of traffic. By implementing the OVC protocol and its multi-layer encryption scheme in the HPC architecture, such high throughputs can be supported. Furthermore, the high throughput also avoids constraining the number of intermediary nodes per chain based on the limits of the multi-layer encryption functionality. The layers of encryption that needs be performed by the source node HPC is directly dependent on the number of intermediary nodes in the chain. Without this constraint, the OVC protocol can more effectively determine best communication path for a chain without being limited.

The OVC protocol and its multi-layer encryption routing can be implemented as another virtualized functionality targeting the HPC that can be integrated with the virtualized functionality of the particular node, whether it is a DM, WSC, or RFDC.

It is the objective of this invention to define a system and a method of providing obfuscated and anonymous communication for a virtualized, modular, and distributed satellite communication infrastructure. The method and system described here is based on a protocol referred to in this invention as OVC protocol, which provides the messaging and hand shake between different node types to establish the chain between each sub-system, as well as, implements the multi-layer encryption. Once the circuit has been established, the OVC implemented as a virtualized application targeting the HPC at every Source Node perform the actual encryption at line rate or the maximum rate of a given communication path. The source nodes are HPC servers that can host and execute the designated functionality, based on whether the node is a User Node, DM Node, WSC Node, or RFDC node, while also integrating the OVC protocol as method for obfuscation of communication traffic.

BRIEF DESCRIPTION OF THE DRAWINGS

FIG. 1 illustrates the prior art of a particular implementation of a modular communication infrastructure;

FIG. 2 illustrates eavesdropping by network intruders in the prior art of a particular implementation of a modular communication infrastructure;

FIG. 3 illustrates traffic analysis by network intruders in the prior art of a particular implementation of a modular communication infrastructure;

FIG. 4 illustrates a particular implementation of an obfuscated and virtualized communication infrastructure in accordance with an implementation of the disclosure;

FIG. 5 illustrates an alternative embodiment of an obfuscated and virtualized communication infrastructure with a bidirectional communication in accordance with an implementation of the disclosure;

FIG. 6 illustrates an alternative embodiment of an obfuscated and virtualized communication infrastructure with a bidirectional communication using two independent circuits in accordance with an implementation of the disclosure;

FIG. 7 illustrates an alternative embodiment of an obfuscated and virtualized communication infrastructure with combined specialized nodes in accordance with an implementation of the disclosure;

FIG. 8 illustrates an alternative embodiment of an obfuscated and virtualized communication infrastructure with a multi-layer encryption providing network security and obfuscation in accordance with an implementation of the disclosure;

FIG. 9 illustrates a particular implementation of a high performance computer architecture for hosting virtualized application in accordance with an implementation of the disclosure;

FIG. 10 illustrates multi-layer encryption and routing in accordance with an implementation of the disclosure.

At the outset, it should be appreciated that like drawing numbers on different drawing views identify identical structural elements of the invention. It also should be appreciated that figure proportions and angles are not always to scale in order to clearly portray the attributes of the present invention.

DETAILED DESCRIPTION

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

This disclosure, its aspects and implementations, are not limited to the specific processing techniques, components, word/bit widths, or methods disclosed herein. Many additional components and processes known in the art consistent with the modification, manipulation and encryption and decryption of a file or files by a computer program are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of a method and approach within an HPC architecture of how to provide obfuscated and high-performance traffic flow in a virtualized and modular communications infrastructure is described. However, as will be clear to those of ordinary skill in the art from this disclosure, the principles and aspects disclosed herein may readily be applied to a multitude of modular and distributed communications infrastructure without undue experimentation.

FIG. 1 illustrates the prior art of a particular implementation of a modular communication infrastructure that is based on purpose-built sub-components with traffic sent as plaintext. In this communication infrastructure, the location of the User, the DM, the WSC, and the RFDC are fixed and the traffic sent over the network is exposed.

FIG. 2 illustrates the prior art of a particular implementation of a modular communication infrastructure where a network intruder can eavesdrop by compromising any one of the nodes to collect critical information, such as the source and destination IP addresses, the location of the sender and recipient, and the content of the payload being transmitted. In this figure, two intruders are both monitoring the user data being sent to a purpose-built DM, as well as, the digitized samples of the modulated carrier from receive RFDC to the receive WSC. The prior art, as shown continues to perform despite having one or more of the network nodes being compromised.

FIG. 3 illustrates the prior art of a particular implementation of a modular communication infrastructure where a network intruder can determine the beginning and end of a communication traffic by simply performing traffic analysis on the traffic through the network. The prior art, as shown, performs in an acceptable manner when any of the network nodes has been compromised FIG. 4 illustrates the novelty of the invention where the modular communication infrastructure is virtualized and obfuscated with the OVC protocol as applications on HPCs to implement the multi-layer routed encryption scheme. The network shown is a unidirectional communication circuit, where one sender is sending data to a recipient. The traffic sent over this network is fully encrypted using multi-layer encryption for highest level of security. In the figure, encrypted circuit is displayed in blue. The source node obtains the directory list from the NDS to determine the best path and the location of the specialized nodes, which includes the DM, WSC, and RFDC. The Public Key Infrastructure (PKI) server provides authentication and public key for each of the nodes in the network.

FIG. 5 illustrates the novelty of the invention where the modular communication infrastructure is supports bidirectional communication along the same circuit.

FIG. 6 illustrates the novelty of the invention where the modular communication infrastructure supports bidirectional communication along two independent circuits.

FIG. 7 illustrates the novelty of the invention where the modular communication infrastructure provides the flexibility of designating a node with more than one specialized function. The figure shows how one designated node has been assigned to function as the DM, WSC, and RFDC simultaneously, while supporting the OVC protocol. Such flexibility is possible because all functionalities are virtualized application targeting the HPC.

FIG. 8 illustrates the novelty of the invention where the OVC protocol and its multi-layer encryption functionality is protecting the traffic and obfuscating the sender and recipient from network intruders. In the FIG. 8, it shows a network intruder that has compromised one of the intermediary nodes between the Sender and the DM Node. Since this chain consists of four nodes, the source node had encrypted this traffic four times. By the time the traffic is decrypted by the second node, there is still two more layers of encryption left to unwrap. In addition, the intruder can only determine that the traffic originated from the previous node and destined for the next node. The figure also shows an intruder that has compromised an intermediary node after the receive RFDC Node. This time the traffic has five additional encryption layers to be unwrapped before the content of the traffic can be exposed. Also, the Sender and the Recipient are kept anonymous.

FIG. 9 illustrates the novelty of the invention where the OVC protocol and its multi-layer encryption functionality is implemented as a virtualized application targeting a heterogenous and parallel processing HPC architecture. This approach to a virtualized application can provide the high-throughput needs of the modular communication infrastructure.

FIG. 10 illustrates the novelty of the invention where the OVC protocol and its multi-layer encryption functionality is providing multi-layer encryption protection on traffic sent from the User Node to the DM Node. In this figure there are four nodes in this chain. Thus, the source HPC performs four layers of encryption with the specific key for every node. For every layer of encryption, the information for the next node to send the traffic to is appended. Each intermediary node uses its own key to unwrap one of the layers of encryption and exposing the destination for the next node, until the traffic arrives at the DM Node and is fully unwrapped.

In the preferred embodiment, the described invention utilizes a high-performance computing HPC PC or server with at least one CPU and a hardware acceleration device and utilizing a high-level coding language platform to perform the method as an application. The HPC PC or the server includes a non-transitory computer-readable storage medium that stores executable instructions embodying the method. The instructions may also reside, completely or at least partially, within a main memory of the HPC PC or the server as instructions and/or within the CPU or the hardware acceleration device as instructions during execution thereof by the HPC PC or the server; the main memory, the CPU, and the hardware acceleration device also constituting machine-accessible storage media.

The term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instruction for execution by the machine and that cause the machine to perform any one or more of the methodologies of the disclosure. The term "non-transitory computer-readable storage medium" shall accordingly be taken to include, but not be limited to, solid-state memories, and optical and magnetic media.

The high-level coding language supports heterogenous and parallel computing to help accelerate particular algorithms of the OVC protocol for maximum throughput. An example of such coding language is the OpenCL language, which allows partitioning of the application between host code running on the CPU and the optimized kernel code running on the hardware acceleration device, such as an FPGA. The OVC protocol may be integrated with the DM, the WSC, and the RFDC virtualized applications. On the other hand, it may also be a separately running application. The multi-layer encryption is one such functionality that will be implemented as optimized kernel code to meet the required throughput for traffic over such network.

The OVC protocol performs the following functionalities:
(a) Messaging between network nodes and the NDS to announce a node's presence, status and capabilities in terms of available compute resource for maintaining the node directory list,
(b) Source Node establishing a multi-layer obfuscated communication chain through intermediary nodes to the Destination Node
(c) Source Node performing the multi-layer encryption using a unique key established with each node in the chain
(d) Intermediary nodes decrypting a layer of encryption to expose the next hop and forwarding traffic to the final Destination Node The User needs to setup a communication path with another user over a satellite link. The User Node HPC communicates with the NDS server to obtain the most current node directory list. The node directory list provides information about all nodes in the network that is critical to the OVC application. Such information includes but is not limited to the availability of the node, the compute power of the node (e.g. HPC or regular server/PC) for hosting virtualized applications, and the trust level for the node. Based on this information, the User Node HPC initiates establishing the chain to include the DM Node, WSC Node, and the RFDC Node. In this chain, none of the intermediary nodes can tell which node is the originator and which one is final recipient of the traffic. Each Intermediary Node will simply forward the traffic to the next node.

The chain establishment is initiated when the User Node HPC obtains the public key of the first intermediary node using a Public Key Infrastructure (PKI). It uses the asymmetric public key to establish a secure connection to the first node. Subsequently, shared secret is created between the User Node and the first node, which is the symmetric key for high-throughput encryption of traffic. Using the secure connection established with the first node, the User Node then communicates securely with the second node to establish a connection between the $2^{nd}$ and $3^{rd}$ nodes. This process continues until the node identified to be the DM Node is reached. The DM Node then initiates the establishment of the next chain in the same exact manner to get to the WSC. Subsequently, the WSC Node initiates the establishment of the next chain to the RFDC Node. Secure OVC signaling over-the-air between the RFDC on the local network with the RFDC on the remote network propagates the chain establishment on the remote network. The same mechanism is used on the remote network to propagate a connection from the remote RFDC Node to a remote WSC node to a remote DM Node to get to the remote User Node.

Once the circuit has been established using the OVC protocol, the User Node HPC performs a multi-layer encryption using the symmetric keys for all the intermediary nodes in the chain to the DM Node. Thus, the user data is encrypted multiple times, where each time a different key associated with each subsequent node in the chain is utilized. The encryption includes the source and destination IP addresses to obfuscate the sender and the recipient. Furthermore, the next node address is prepended to the traffic being encrypted for every layer in this multi-layered encryption process. The multi-layered encrypted traffic is sent to the first node, where the first layer of encryption is unwrapped and information about the next destination node is uncovered. The first node forwards the encrypted traffic onto the second node, where another layer of encryption is removed and the next destination node address is uncovered. This process continues through all intermediary nodes until the traffic arrives at the Destination Node, which is the DM Node. The DM Node removes the final layer of encryption to extract the user data. As a DM Node, it executes the DM functionality to apply the waveform function to the user data to generate a modulated signal. The actual waveform type is user application dependent. The modulated I/Q samples that may be encapsulated in a proprietary or standard framing structure, such as ANSI TIA 5041, are then encrypted multiple times with the traffic encryption keys of the next set of nodes to get to the WSC Node. Once the data has arrived at the WSC Node, the appropriate WSC transfer function is applied to the decrypted output from the DM. The WSC Node then constitutes the next Source Node for the chain to the RFDC node. The WSC Node encrypts the WSC output multiple times with the symmetric keys for the corresponding nodes in this chain. When the sampled I/Q arrive at the RFDC, the decrypted samples are converted to RF signal for transmission over the satellite link to the remote side of the network. If the RFDC Node utilizes Transmission Security (TRANSEC), then the transmitted RF signal can also be maintained obfuscated. On the remote side of the network, the same multi-layer encryption across each chain is performed until the user data is received by the recipient and final decryption is performed to uncover the plaintext information that was sent by the sender. In this end-to-end circuit, none of the intermediary nodes can determine the source of the data or the final recipient. Thus, any intermediary node that has been compromised cannot reveal any critical information about the data. Furthermore, the data itself is encrypted multiple times for added security.

In the preferred embodiment, all Source Nodes functionality in every chain performing the multi-layer encryption operation are software applications implemented for an HPC architecture to deliver line rate performance. This means the User Node, DM Node, WSC Node, and the RFDC Node are all HPCs with the OVC protocol implemented as a software application.

In an alternate embodiment, encrypted traffic is sent continuously across every chain to prevent traffic analysis of when actual traffic starts and stops. This is achieved by sending dummy data from a Source Node to a Destination Node, where the dummy data is extracted and discarded.

In an alternate embodiment, if a circuit is broken either due to malfunction of a node or due to an attack on a network, the OVC protocol can re-establish a new circuit path between the sender and the recipient to avoid the affected nodes.

The following are particular implementations of the of the OVC protocol as a HPC application, and the use of these methods are provided as non-limiting examples.

A user desires to send user data from a source location to a remote location using a virtualized, modular, and distributed circuit consisting of a DM, a WSC, and a RFDC. The user requires to send the user data as a Digital Video Broadcast, Gen 2 (DVB-S2) modulated carrier. Thus, the DM is configured as a DVB-S2 instance. The user HPC communicates with the NDS to obtain the most up-to-date directory list for the nodes in the network using OVC messaging protocol. Based on the available nodes, the OVC protocol running as an application on the user HPC defines the most optimal path to close a circuit with the remote user. Using the PKI infrastructure, each source node obtains the public key for all the intermediary nodes in their respective chain. Each source node uses secure communication to negotiate a shared secret to be used for symmetric key encryption of the traffic. AES-256 in CBC mode is used to encrypt the traffic across all chains. The user data is 50 Mbps in throughput, while the output of the DM is 5.2 Gbps of traffic. The output of the DM is an ANSI TIA 5041 encapsulated frame structure consisting of 16-bits of I/Q samples at a sampling rate of 150 Msps. The WSC combines four carriers sampled at 150 Msps for a combined traffic rate of approximately 20.8 Gbps to the RFDC. The OVC protocol implemented as a virtualized application targeting the HPC provides the multi-layer encryption at the rates of 50 Mbps, 5.2 Gbps, and 20.8 Gbps to the DM Node, the WSC Node, and the RFDC Node, respectively. Such high throughput (performance) is achieved by partitioning the OVC protocol appropriately between the CPU host code and the FPGA optimized kernel code. The RFDC is configured for L-Band operation.

A user desires to send user data from a source location to a remote location using a virtualized, modular, and distributed circuit consisting of a DM, a WSC, and a RFDC. The user requires to send the user data as a spread spectrum modulated carrier. Thus, the DM is configured as a Spread Spectrum virtual waveform instance. The user HPC communicates with the NDS to obtain the most up to date directory list for the nodes in the network using OVC messaging protocol. Based on the available nodes, the OVC protocol running as an application on the user HPC defines the most optimal path to close a circuit with the remote user. Using the PKI infrastructure, each source node obtains the public key for all the intermediary nodes in their respective chain. Each source node uses secure communication to negotiate a shared secret to be used for symmetric key encryption of the traffic. AES-128 in Counter mode is used to encrypt the traffic across all chains. The user data is 1 Mbps in throughput, while the output of the DM is 3.9 Gbps of traffic. The output of the DM is a proprietary encapsulated frame structure consisting of 12-bits of I/Q samples at a sampling rate of 150 Msps. The WSC combines ten carriers sampled at 150 Msps for a combined traffic rate of approximately 40 Gbps to the RFDC. The OVC protocol implemented as a virtualized application targeting the HPC provides the multi-layer encryption at the rates of 1 Mbps, 3.9 Gbps, and 40 Gbps to the DM Node, the WSC Node, and the RFDC Node, respectively. Such high throughput (performance) is achieved by partitioning the OVC protocol appropriately between the CPU host code and the FPGA optimized kernel code. The RFDC is configured for L-Band operation.

A user desires to send user data from a source location to a remote location using a virtualized, modular, and distributed circuit consisting of a DM, a WSC, and a RFDC. The communication circuit is to be fully obfuscated using the OVC protocol. The user requires to send the user data as a 5G modulated carrier for a wireless network. Thus, the DM is configured as a 5G virtual instance. The RFDC is configured for the LTE frequency range.

A user desires to send user data from a source location to a remote location using a virtualized, modular, and distributed circuit consisting of a DM, a WSC, and a RFDC. The communication circuit is to be fully obfuscated using the OVC protocol. The user requires to send the user data as a tactical radio modulated carrier. Thus, the DM is configured as a Single Channel Mode (SCM) virtual instance. The RFDC is configured for VHF operation.

We claim:

1. A system for providing an anonymous and obfuscated communication over a virtual, modular and distributed satellite communication network, the system comprising:
   a node directory server (NDS);
   an obfuscated virtual communication (OVC) protocol, wherein the OVC protocol is configured to perform:
      messaging between network nodes and the NDS to announce node presence, status, or capability;
      establishing a first multi-layer obfuscated communication circuit between Users via intermediary nodes, digital modem (VM) nodes, Wideband Signal Channelizer (WSC) nodes, or Radio Frequency Digital Converter (RFDC) nodes; where the circuit is a series connection of chains including a source node, one or more intermediary nodes, and a destination node;
      performing a multi-layer encryption of traffic across each chain in a first multi-layer obfuscated communication circuit via a unique key established with each intermediary node in a chain; and
      decrypting a layer of encryption of the intermediary nodes as traffic propagates from the source node to the destination node;
   a network;
   a public key server; and
   a satellite communication line.

2. The system of the claim 1, wherein the OVC protocol is a high level coding language platform running on a high performance computer or a server.

3. The system of the claim 2, wherein the OVC protocol and multi-layer encryption function is implemented in Open Computing Language (OpenCL).

4. The system of the claim 3, wherein the multi-layer encryption performed by the source node in every chain is implemented as an optimized OpenCL kernel code targeting a hardware acceleration device in a high performance computer to achieve high-throughput line rate operation.

5. The system of the claim 2, wherein the high performance computer comprises at least one processor and a hardware acceleration device.

6. The system of the claim 5, wherein the processor comprises at least one or more cores, and wherein the hardware acceleration device comprise at least one of a designated central processing unit, a graphic processing unit, or a field programmable gate array.

7. The system of the claim 1, wherein the NDS provides information about one or more of the nodes in the network.

8. The system of the claim 7, wherein the information comprises availability of computing resources and trust level for one or more of the nodes.

9. The system of the claim 1, wherein the DM, the WSC, and the RFDC can be combined to share a same node.

10. The system of the claim 1, wherein the multi-layer encryption performed by the source node in every chain includes Internet Protocol (IP) source and destination addresses for anonymity.

11. The system of the claim 1, wherein the DM incorporates Transmission Security (TRANSEC) to provide obfuscation of an RF signal when transmitted over a satellite link.

12. The system of the claim 1, wherein dummy data is encrypted and sent across a chain when there is no data to send to prevent traffic analysis.

13. The system of the claim 1, wherein the OVC protocol re-establishes a second multi-layer obfuscated communication circuit in response to a broken first multi-layer obfuscated communication circuit via malfunction of at least one of the intermediary nodes or an attack on the network.

14. A method for providing anonymous communication over a virtual, modular and distributed satellite communication network, the method comprising:
   communicating between a source and a node directory server (NDS) to obtain a current directory list for one or more nodes in a network via an obfuscated virtual communication OVC protocol, wherein the node and the NDS exchange messages via the OVC protocol to announce the node's presence, status, or capability;
   defining a first path to close a circuit with a destination via the OVC protocol in response to obtaining a current directory list for the nodes, wherein the first path is a series of connection of chains including the source, one or more intermediary nodes, and a destination, and wherein the intermediary nodes comprise digital modem (VM) nodes, Wideband Signal Channelizer (WSC) nodes, or Radio Frequency Digital Converter (RFDC) nodes;
   obtaining a public key for each node via a public key infrastructure;
   performing a multi-layer encryption of data across each chain via a unique key established with each intermediary node; and
   sending the data from the source to the destination via a satellite communication line through the network nodes, wherein each node communicates to negotiate a shared secret to be used for a symmetric key encrypting the data via a secure communication, and wherein a layer of encryption of the data is decrypted as the data propagates from the source to the destination.

15. The method of the claim 14, wherein the OVC protocol is a high level coding language platform running on a high performance computer or a server.

16. The method of the claim 15, wherein the high performance computer comprises at least one processor and a hardware acceleration device.

17. The method of the claim 16, wherein the processor comprises one or more cores, and wherein the hardware acceleration device comprise at least one of a designated central processing unit, a graphic processing unit, or a field programmable gate array.

18. The method of the claim 14, wherein the NDS provides information about one or more of the nodes in the network.

19. The method of the claim 18, wherein the information comprises availability of the nodes, computing resources of the nodes, and trust level for one or more of the nodes.

20. The method of the claim 14, wherein the DM, the WSC, and the RFDC can be combined to share a same node.

21. The method of the claim 14, wherein the multi-layer encryption performed by the source in every chain includes Internet Protocol (IP) source and destination addresses for anonymity.

22. The method of the claim 14, wherein the DM incorporates Transmission Security (TRANSEC) to provide obfuscation of an RF signal when transmitted over a satellite link.

23. The method of the claim 14 further comprising sending encrypted dummy data to prevent traffic analysis in response to the network being idle.

24. The method of the claim 14, wherein the OVC protocol and a multi-layer encryption function is implemented in Open Computing Language (OpenCL).

25. The method of the claim 24, wherein the multi-layer encryption performed by the source in every chain is implemented as an optimized OpenCL kernel code targeting a hardware acceleration device in a high performance computer to achieve high-throughput line rate operation.

26. The method of the claim 14 further comprising re-establishing a second path via the OVC protocol in response to a broken first path via malfunction of at least one of the intermediary nodes or an attack on the network.

27. A non-transitory computer readable storage medium storing instructions that when executed by a processing device, cause the processing device to:
communicate between a source and a node directory server (NDS) to obtain a current directory list for one or more nodes in a network via an obfuscated virtual communication OVC protocol, wherein the node and the NDS exchange messages via the OVC protocol to announce the node's presence, status, or capability;
define a first path to close a circuit with a destination via the OVC protocol in response to obtaining a current directory list for the nodes, wherein the first path is a series of connection of chains including the source, one or more intermediary nodes, and a destination, and wherein the intermediary nodes comprise digital modem (VM) nodes, Wideband Signal Channelizer (WSC) nodes, or Radio Frequency Digital Converter (RFDC) nodes;
obtain a public key for each node via a public key infrastructure;
perform a multi-layer encryption of data across each chain via a unique key established with each intermediary node; and
send the data from the source to the destination via a satellite communication line through the network nodes, wherein each node communicates to negotiate a shared secret to be used for a symmetric key encrypting the data via a secure communication, and wherein a layer of encryption of the data is decrypted as the data propagates from the source to the destination.

28. The non-transitory computer-readable storage medium of claim 27, wherein the OVC protocol is a high level coding language platform running on a high performance computer or a server.

29. The non-transitory computer-readable storage medium of claim 28, wherein the high performance computer comprises at least one processor and a hardware acceleration device.

30. The non-transitory computer-readable storage medium of claim 29, wherein the processor comprises one or more cores, and wherein the hardware acceleration device comprise at least one of a designated central processing unit, a graphic processing unit, or a field programmable gate array.

31. The non-transitory computer-readable storage medium of claim 28, wherein the OVC protocol and a multi-layer encryption function is implemented in Open Computing Language (OpenCL).

32. The non-transitory computer-readable storage medium of claim 31, wherein the multi-layer encryption performed by the source node in every chain is implemented as an optimized OpenCL kernel code targeting a hardware acceleration device in a high performance computer to achieve high-throughput line rate operation.

33. The non-transitory computer-readable storage medium of claim 27, comprising further instructions that, when executed by the processing device, cause the processing device to re-establish a second path via the OVC protocol in response to a broken first path via malfunction of at least one of the intermediary nodes or an attack on the network.

34. The non-transitory computer-readable storage medium of claim 27, wherein the NDS provides information about one or more of the nodes in the network.

35. The non-transitory computer-readable storage medium of claim 34, wherein the information comprises availability of the nodes, computing resources of the nodes, and trust level for one or more of the nodes.

36. The non-transitory computer-readable storage medium of claim 27, wherein the DM, the WSC, and the RFDC can be combined to share a same node.

37. The non-transitory computer-readable storage medium of claim 27, wherein the multi-layer encryption performed by the source node in every chain includes Internet Protocol (IP) source and destination address for anonymity.

38. The non-transitory computer-readable storage medium of claim 27, wherein the DM incorporates Transmission Security (TRANSEC) to provide obfuscation of an RF signal when transmitted over a satellite link.

39. The non-transitory computer-readable storage medium of claim 27, comprising further instructions that, when executed by the processing device, cause the processing device to send encrypted dummy data to prevent traffic analysis in response to the network being idle.

* * * * *